United States Patent [19]

Kleppner et al.

[11] Patent Number: 5,699,773
[45] Date of Patent: Dec. 23, 1997

[54] ARRANGEMENT FOR PUMPING FUEL OUT OF A SUPPLY TANK TO AN INTERNAL COMBUSTION ENGINE

[75] Inventors: Stephan Kleppner, Bretten; Ansgar Seitz, Neuhausen, both of Germany

[73] Assignee: Robert Bosch GmbH, Stuttgart, Germany

[21] Appl. No.: 776,705

[22] Filed: Feb. 12, 1997

[30] Foreign Application Priority Data

Jun. 13, 1995 [DE] Germany .................. 195 21 509.5

[51] Int. Cl.$^6$ .................................................. F02M 37/04
[52] U.S. Cl. ........................................ 123/510; 123/509
[58] Field of Search .......................... 123/509, 510, 123/514, 463; 137/576, 572, 574, 565

[56] References Cited

U.S. PATENT DOCUMENTS

| | | | |
|---|---|---|---|
| 4,622,937 | 11/1986 | Fales | 123/509 |
| 4,776,315 | 10/1988 | Greiner | 123/510 |
| 4,831,990 | 5/1989 | Tuckey | 123/510 |
| 4,844,704 | 7/1989 | Jiro | 123/509 |
| 4,886,031 | 12/1989 | Bocci | 123/509 |
| 5,046,471 | 9/1991 | Schmid | 123/510 |
| 5,195,494 | 3/1993 | Tuckey | 123/510 |
| 5,452,701 | 9/1995 | Tuckey | 123/509 |
| 5,456,235 | 10/1995 | Porter | 123/509 |
| 5,560,342 | 10/1996 | Fournier | 123/509 |

*Primary Examiner*—Carl S. Miller
*Attorney, Agent, or Firm*—Edwin E. Greigg; Ronald E. Greigg

[57] ABSTRACT

An arrangement for pumping fuel out of a supply tank to an internal combustion engine having an electrically driven pumping unit which is disposed in a ram pot inserted into the supply tank. The ram pot is filled with fuel from the tank by means of a jet pump provided on its bottom; the intake opening of the jet pump is preceded by a filter that is formed by at least one ring of teeth axially protruding from the bottom of the ram pot, which enclose an intake chamber into which the intake opening of the jet pump protrudes.

10 Claims, 3 Drawing Sheets

ARRANGEMENT FOR PUMPING FUEL OUT OF A SUPPLY TANK TO AN INTERNAL COMBUSTION ENGINE

PRIOR ART

The invention is based on an arrangement for pumping fuel out of a supply tank to an internal combustion engine. In one such pumping arrangement, known from German Patent 35 10 890, an electrically driven pumping unit is placed in a ram pot, which in turn is disposed in the fuel tank in such a way that it is kept constant in contact with its bottom on the bottom of the fuel tank. The ram pot is filled with fuel from the supply tank by means of a jet pump inserted in its bottom (see FIGS. 2 and 3); to that end, the jet pump is driven by the fuel stream returning from the engine to be supplied.

The pumping unit aspirates the fuel from the ram pot via an intake connector stub, and then pumps it at increased pressure into a supply line to the engine, which line is connected to an outlet opening or a pressure connector stub.

To avoid aspiration of dirt particles, located in the supply tank, into the pumping unit and to the engine, the known pumping arrangement has a fuel filter, embodied there as a filter disk and secured in such a way to the end of the ram pot toward the bottom of the supply tank that it defines an aspiration chamber, between the filter and a lower wall of the ram pot, into which the intake connector stub of the pumping unit protrudes.

However, the known pumping arrangement has the disadvantage that the fuel filter is relatively complicated to install, which means a high production cost.

Moreover, in the known pumping arrangement, the filter arrangement requires a relatively high location of the intake opening of the jet pump, so that with the known pumping arrangement it is not possible, when the level of fuel in the supply tank is very low, to still pump fuel from the tank into the ram pot.

ADVANTAGES OF THE INVENTION

The arrangement according to the invention for pumping fuel out of a supply tank to an internal combustion, has the advantage over the prior art that by the disposition of a filter ring directly on the bottom of the ram pot, the intake opening of the jet pump can be located near the bottom of the fuel tank, so that even if the tank is nearly empty, reliable aspiration of the filtered fuel from the supply tank into the ram pot is still assured.

In addition, by the one-piece embodiment of the filter and ram pot, one additional installation operation can be omitted, which considerably lowers the production costs. This effect is reinforced still further because the receptacle for the jet pump is jointly formed into the filter bottom.

Because of the advantageously offset disposition of the filter rings from axially protruding teeth (nubs), the effect of a labyrinth filter is attained, whose filtering action is further reinforced by the sharp edges on the teeth, at which the first particles are caught and trapped.

To enable reliable avoidance of soiling of the pumping unit and engine from dirt particles in the fuel even over long periods of operation, the pumping arrangement according to the invention, compared with the known arrangement for pumping fuel, has additional filters, one of which is upstream of the intake opening of the pumping unit and another of which is inserted between the outlet opening of the pumping unit and the supply line to the engine; these two fuel filters, with a tubular housing for receiving the pumping unit, also form a structural unit, which is simple to insert into the ram pots and thus minimizes the effort and expense of installation.

Other advantages and advantageous features of the subject of the invention may be learned from the specification, the drawing and the claims.

BRIEF DESCRIPTION OF THE DRAWINGS

Two exemplary embodiments of the arrangement according to the invention for pumping fuel out of a supply tank to an internal combustion engine are shown in the drawing and will be described in further detail in the description.

DESCRIPTION OF THE EXEMPLARY EMBODIMENTS

Figure 1:
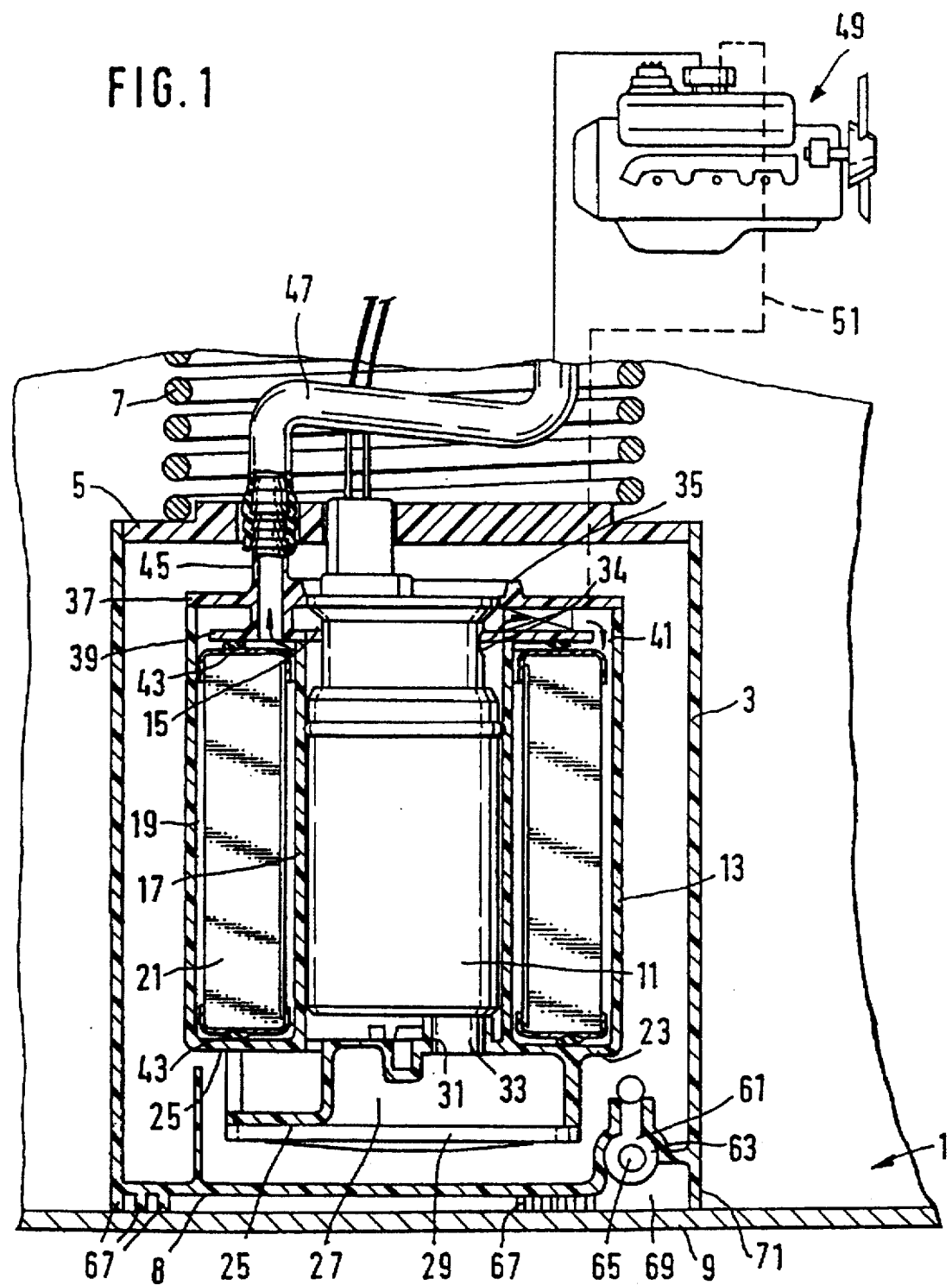
FIG. 1 is a simplified sectional view of the pumping arrangement, disposed in a ram pot retained on the bottom of the supply tank.

The pumping arrangement shown in FIG. 1 has a ram pot 3, which is inserted into a fuel supply tank 1 and is retained, by means of a compression spring 7 acting on a cap 5 of the ram pot 3, with its bottom 8 contacting the bottom 9 of the tank 1. The compression spring 7 is braced on its other end on an upper wall, not shown, of the tank 1, preferably a tank cap that closes the tank 1.

Disposed in the ram pot 3 is a housing 13, which receives an electrically driven pumping unit 11 as well as one fuel filter each upstream and downstream of the pumping unit. The substantially cylindrical housing 13 has two coaxial chambers, of which a first chamber 15, formed inside a tubular guide portion 17 disposed centrally in the housing 13, receives the pumping unit 11. The guide portion 17, with its cylindrical circumferential wall, defines a second chamber 19, annularly surrounding the guide portion 17, inside the housing 13; the outer boundary of this chamber is formed by the inner wall of the housing 13. Inserted into this annular second chamber 19 is an annular filter 21, which is adapted to the shape of the chamber 19.

The housing 13, on one end, has a cross-sectional reduction formed by way of a shoulder 23 that axially defines the second chamber 19, and is closed there by means of an end wall 25, which extends in an extension of the shoulder 23 as far as the guide portion 17, thus connecting that portion to the housing 13. The end wall 25, which is preferably integral with the housing 13 and the tubular guide portion 17, is partly indented inward in cuplike fashion, thus forming an antechamber 27, which on its side remote from the end wall 25 is closed off by a disklike filter 29. In its indented region, the end wall 25 also has a guide bore 35, through which an intake connector stub 33, forming the intake connection of the pumping unit 11, protrudes into the antechamber 27.

On its end protruding into the first chamber 15, the pumping unit 11 has an outlet opening 34, through which the pump fuel emerges at increased pressure from the pumping unit 11 into the first chamber 15.

On its side remote from the end wall 25, the common housing 13 is closed by a double-walled closure cap 35, which with an upper wall 37 seals off the housing 13 from the outside. A lower wall 39, axially offset from the upper wall 37 and having a lesser radial extent, forms a gap 41 between itself and the inner wall of the housing 13, by way of which the pumped fuel can spill over from the first chamber 15 into the second chamber 19; a sealing ring 43 on the axial end faces of the annular filter 21 divides an inlet-side outer region of the second chamber 19 from an outlet-side inner region, thus assuring a radial flow through the annular filter 21.

An opening for the leadthrough of the electrical connection of the pumping unit 11 is provided in the closure cap 35 in the region of the first chamber 15, and opening that receives a pressure connector stub 45 is provided in the inner region of the second chamber 19. Connected to this pressure connector stub 45 is a supply line 47 to the engine 49 to be supplied; leasing away from it is a return line 51, which in turn, in a manner not shown in further detail, discharges into the ram pot 3.

Figure 2:
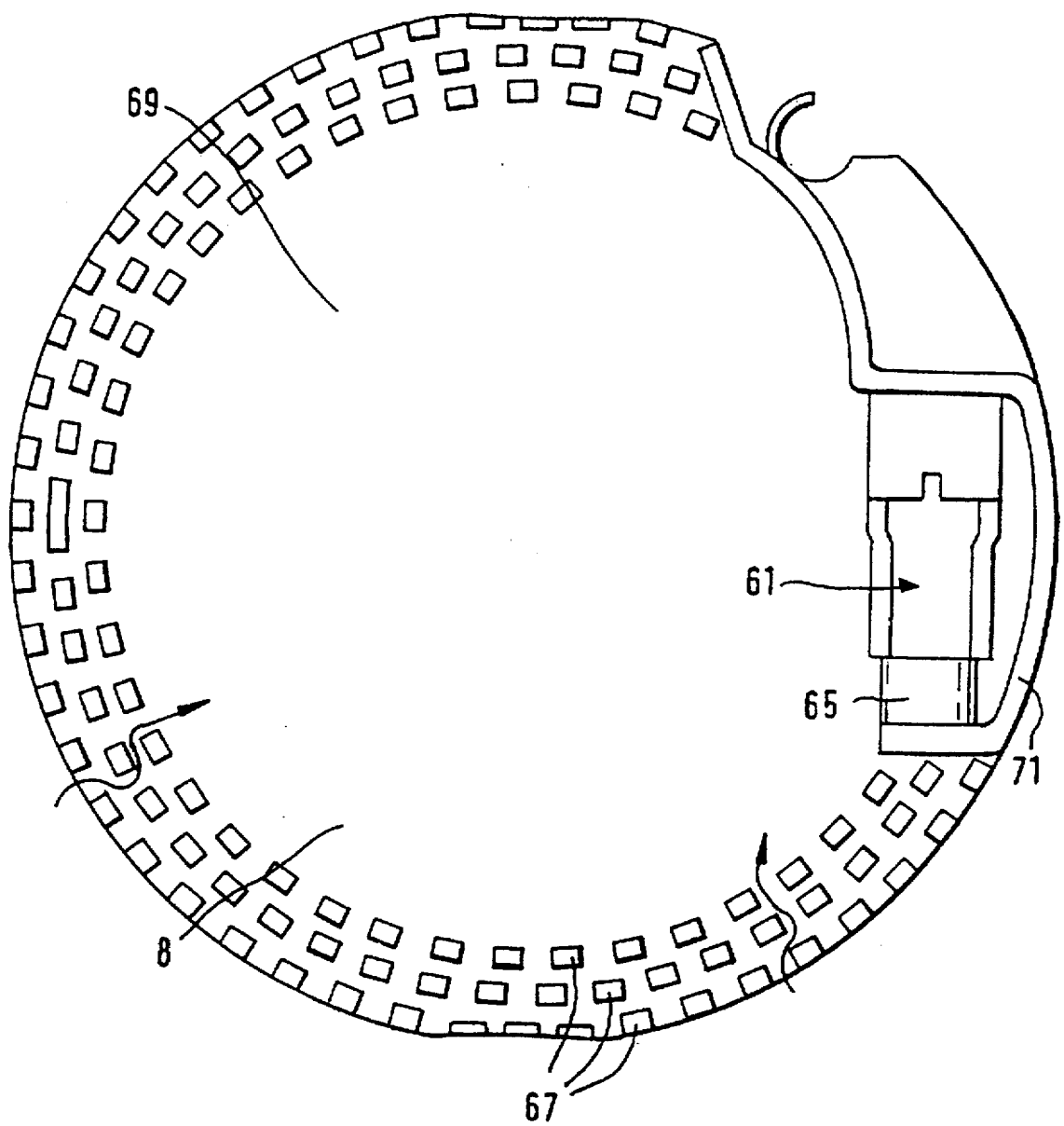
FIG. 2 shows a first exemplary embodiment of the filter, disposed on the bottom of the ram pot, in a view toward the bottom of the ram pot, in which the filter is formed by a plurality of rings of axially protruded formed-on protrusions.
Figure 3:
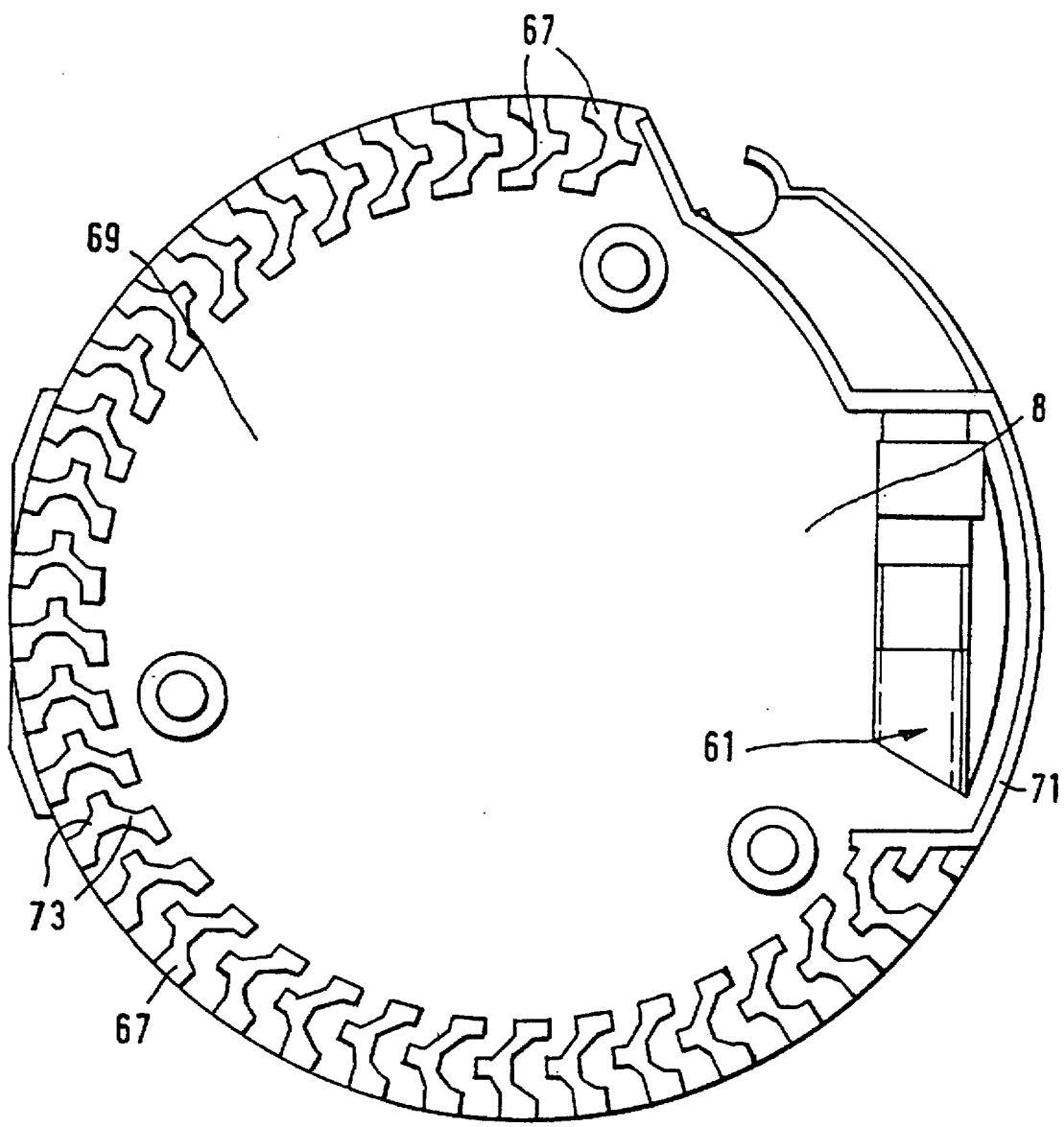
FIG. 3 shows a second exemplary embodiment of the filter, in which the offset formed-on protrusions of the rings are each joined to one another by webs.

The filling of the ram pot 3 with fuel from the tank 1 is effected by means of a jet pump 61, which is inserted into a receiving opening 63 formed into the bottom 8 of the ram pot 3. The jet pump 61 in the exemplary embodiment, which functions on the principle of a suction jet pump, is driven in a known manner by the fuel stream flowing back via the return line 51. The intake opening 65 of the jet pump 61, shown in greater detail in FIGS. 2 and 3, is arranged in such a way that only fuel from the region near the tank bottom 9 is aspirated. In addition, the jet pump 61 is surrounded radially outward by a wall 71 protruding axially from the bottom 8 of the ram pot 3; this wall assures that only fuel located radially inward will be aspirated.

For filtering this aspirated fuel, in a first exemplary embodiment, shown in FIG. 2, three rings of preferably sharp-edged teeth protruding axially from the ram pot bottom 8 are arranged around the edge of the bottom 8 of the ram pot 3; the teeth are offset from one another and thus form a labyrinth filter for the intake chamber 69 formed inside the filter rings 67; the end faces of the teeth 67 and of the wall 71 are retained sealingly against the bottom 9 of the tank 1.

FIG. 3 shows a second exemplary embodiment of the labyrinth filter on the bottom 8 of the pump 3; in it, the adjacent teeth of the coaxial filter rings are each joined to one another by a web 73 in such a way as to create an Ω-shaped profile, which points in the direction of the filter ring.

The arrangement according to the invention for pumping fuel from a tank 1 into an engine 49 functions as follows.

During operation of the pumping unit 11, fuel is aspirated via its intake connector stub 33 from the fuel-filled antechamber 27 disposed in the ram pot 3. This fuel, on flowing from the tank 1 into the antechamber 27, is filtered on its passage through the disklike filter 29 that defines the antechamber 27; the disklike filter 29 forms the fuel filter upstream of the pumping unit 11. In the pumping unit 11, the fuel is increased in pressure in a known manner, and it then flows out of the outlet opening 34 into the first chamber 15 and, via the double-walled closure cap 35 and the gap 41, on into the second chamber 19. There, after radially flowing through the annular filter 27, it reaches the pressure connector stub 45, by way of which the fuel to be pumped flows into the supply line 47 to the engine 49. The annular filter 41 forms the fuel filter downstream of the pumping unit 11; this filter prevents damage to the engine and especially its injection system from dirt particles or particles of abraded material in the fuel.

The filling of the ram pot 3 is done by means of the jet pump 61, which is driven by the fuel returning from the engine 49 and which aspirates fuel from t-he aspiration chamber 69 below the bottom 8 of the ram pot 3. This aspirated fuel is prefiltered by its flow through the rings of teeth 67 axially protruding from the ram pot bottom 8; the rings form a labyrinth seal, so that clogging from soiling of the filters 21, 29, which are integrated in the housing 13 of the pumping unit 11, can be avoided over long periods of operation.

The disposition according to the invention of a filter upstream of the intake opening 65 of the jet pump 61, on the bottom 8 of the ram pot 3 is not limited to a pumping arrangement of the type described, but can instead be provided alternatively in any other pumping arrangements in which a ram pot inserted into a tank is filled by means of a jet pump on its bottom.

The foregoing relates to preferred exemplary embodiments of the invention, it being understood that other variants and embodiments thereof are possible within the spirit and scope of the invention, the latter being defined by the appended claims.

What is claimed and desired to be secured by U.S. Letters Patent is:

1. An arrangement for pumping fuel out of a supply tank (1) to an internal combustion engine (49), comprising an electrically driven pumping unit (11), which has an intake connector stub (33) and an outlet opening (34) that communicates at least indirectly with a supply line (47) to the engine (49), the pumping unit (11) is disposed in a ram pot (3), the ram pot is retained by a bottom (8) on a bottom (9) of the supply tank (1) by means of a resilient element (7), the ram pot can be filled with fuel from the tank (1) by means of a jet pump (61), an intake opening (65) of the jet pump (61) is preceded by a filter, the filter is formed by at least one ring of formed-protrusions (67), which protrude axially from the bottom (8) of the ram pot (3), to a bottom of the supply tank, a flow cross section is provided between said protrusion which forms a gap filter, protrusions in combination with said ram pot housing enclose an aspiration chamber (69) from which an intake opening (65) of the jet pump (61) aspirates fuel.

2. The arrangement of claim 1, in which a plurality of rings of formed-on protrusions (67) form the filter, and radially successively located protrusions (67) of said filter are offset from one another thereby, forming a labyrinth seal with gap filter elements.

3. The arrangement of claim 1, in which the formed-on protrusions (67) of the filter ring are embodied as teeth, whose end faces rest sealingly on the bottom (9) of the tank supply (1), and whose transitions between individual side faces are sharp-edged.

4. The arrangement of claim 1, in which the ram pot (3) and the filter preceding the jet pump (61) are embodied integrally.

5. The arrangement of claim 1, in which the jet pump (61) is disposed in a suitably shaped receiving opening (63) in the bottom (8) of the ram pot (3).

6. The arrangement of claim 1, in which the jet pump (61) is driven by a return quantity of fuel flowing from the engine (49).

7. The arrangement of claim 1, in which an intake connector stub (33) of the pumping unit (11) is preceded by a filter disk (29), which closes off an antechamber (27) that forms a suction chamber of the pumping unit from the interior of the ram pot (3).

8. The arrangement of claim 1, in which between an outlet opening (34) of the pumping unit (11) and the supply line

(47) to the engine (49), a further, annular filter (21) is provided, said annular filter is inserted into a cylindrical housing (13) for receiving the pumping unit (11).

9. The arrangement of claim 1, in which the resilient element that presses the ram pot (3) against the bottom (9) of the tank (1) is embodied by a compression spring (7), which is fastened between a cap of the ram pot (5) in an upper housing wall of the tank (1), and a portion of the supply tank.

10. The arrangement of claim 2, in which the adjacent protrusions (67) of the individual coaxial filter rings are joined to one another by webs (73) in such a way that they form an Q-shaped profile pointing in the circumferential direction of the filter ring.

\* \* \* \* \*